No. 858,458. PATENTED JULY 2, 1907.
A. H. KINDER.
SPARE TIRE CASE.
APPLICATION FILED FEB. 19, 1906.
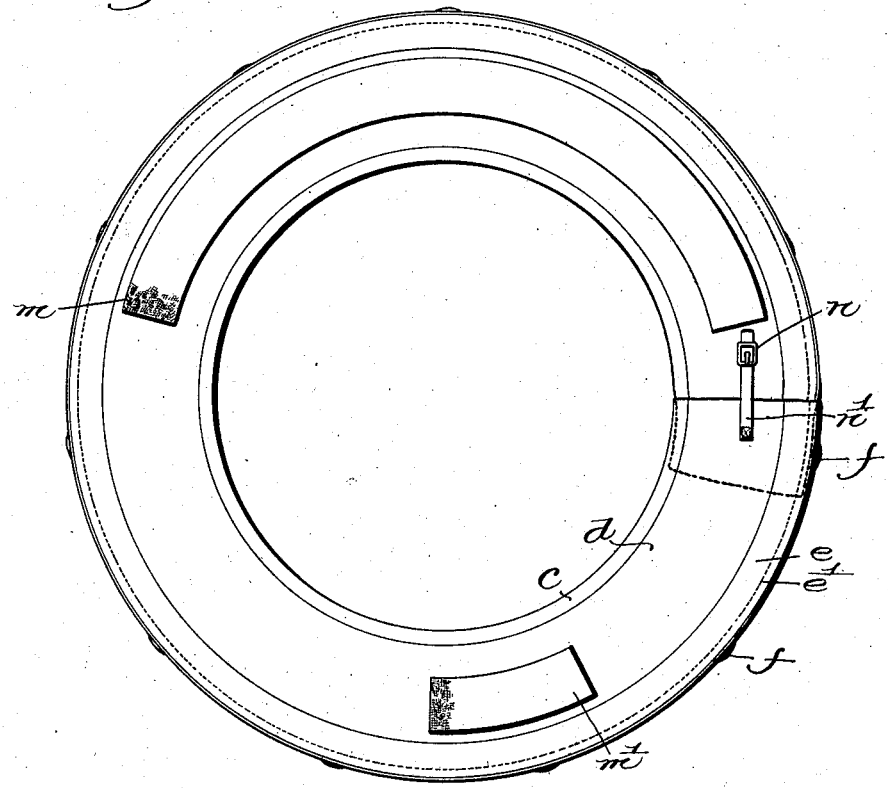
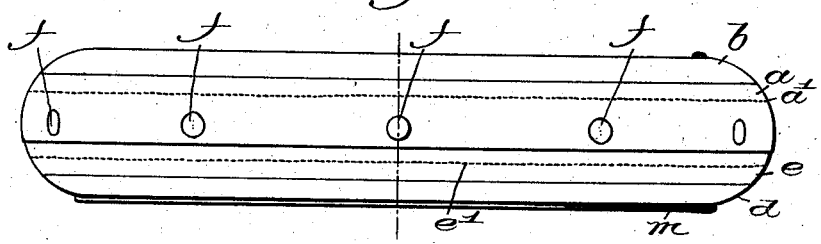
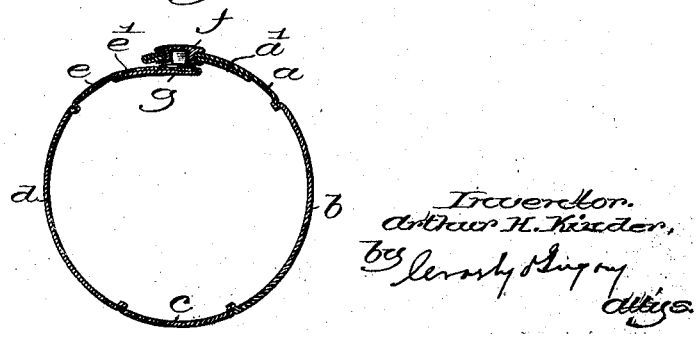

UNITED STATES PATENT OFFICE.

ARTHUR H. KINDER, OF ROXBURY, MASSACHUSETTS, ASSIGNOR TO FRANK B. HOPEWELL, OF NEWTON, MASSACHUSETTS.

SPARE-TIRE CASE.

No. 858,458.  Specification of Letters Patent.  Patented July 2, 1907.

Application filed February 19, 1906. Serial No. 301,751.

*To all whom it may concern:*

Be it known that I, ARTHUR H. KINDER, a citizen of the United States, residing in Roxbury, county of Suffolk, State of Massachusetts, have invented an Improvement in Spare-Tire Cases, of which the following description, in connection with the accompanying drawings, is a specification, like letters on the drawings representing like parts.

This invention has for its object the production of a novel tire case to contain a spare or extra tire to be carried on an automobile for use should an accident happen to a tire on a running wheel.

My novel case is circular or ring shaped and in cross section is of a width to fit about and lap over the tire, the case having fastenings near its opposite edges where they overlap at the tread surface of the tire.

The material of which the case is composed will preferably be more or less water proof or water repellent. I have also provided one side of the case with a buffer to obviate marring the paint or finish of the body of the automobile.

Figure 1 show a rear side elevation of my novel tire case; Fig. 2 an edge view of the same supposed to be fastened to a tire; Fig. 3 a section thereof.
In the manufacture of my novel tire case, I take a plurality of strips of suitable material, said strips being herein lettered $a$, $b$, $c$, $d$ and $e$, and I stitch the edges of these strips together making a flat strip of such width and length as to embrace the tire from its inner side outwardly when the ends of the strips are overlapped or brought together. I have shown the outer and longer edges of the strips $a$ and $e$ as turned inwardly and these inturned edges are stitched as at $a'$, $e'$. I set in the edge $a$ a series of sockets $f$, while further back from the edge $e$ I set a series of studs $g$ having ball-shaped heads. When the case is opened, it may be inserted into the hollow open center of the tire and I then bend or turn the outer edges of the case outwardly, up and over the tread surface of the tire from opposite directions and overlap the edge $a$ over the edge $e$ and unite the fastenings by snapping the sockets over the studs. This may be done easily, and by engaging by hand the overlapped edge of the case having the sockets the latter may almost instantly be disengaged from the studs, thus exposing the tire that access may be had quickly to the same. I have shown fastening means of the ball and socket variety as the same may be engaged and disengaged very quickly, and when engaged hold securely the overlapped parts of the case, but instead of the particular fastenings which are adapted to be snapped one on to the other, I may employ any other usual fastenings where one part engages directly another part. The strips when stitched together form a single broad strip, and when the ends of the strip are overlapped or brought together or united, the case represents a part of a tube.

That the tire case when strapped on to the automobile body may not wear, mar or injure the paint or finish of the body, I have provided the inner side of the tire case with a buffer, preferably of felt, plush, or other soft cloth that will not, by contacting with the paint or finish, mar the same. This buffer is represented at $m$ and $m'$, it being applied in two places to contact with the body at one end of the seat and with the body in line with the usual foot board. It will be obvious that the buffer may extend entirely about the case and may be composed of any soft material which may be duly attached to and form part of the case.

The case is shown as having one end fitting within or overlapping the other end, and one end of the case may have a buckle $n$ and the other a strap, $n'$, there being a buckle and strap at each side of the case, the same being connected with the parts $a$ and $e$. When the buckle engages the strap, the ends of the case will meet or overlap, and by or through this strap and buckle, which constitutes the adjusting means, the length of the case may be adapted to the diameter of the tire so that a person may use one of my improved cases for tires of different diameters. It will be, however, understood that when the case is to fit a tire of a particular diameter, that the ends of the straps $a$, $b$, $c$, $d$, and $e$ may be united by clutching or in any other suitable manner.

Having fully described my invention what I claim as new and desire to secure by Letters Patent is:—

A tire case comprising a strip of material having fastenings at its longer edges to be engaged when said edges are overlapped about a tire, one of the ends of said case adapted to fit within the other end and means for adjustably connecting said ends whereby the case may be adapted to tires of different diameters.

In testimony whereof, I have signed my name to this specification, in the presence of two subscribing witnesses.

ARTHUR H. KINDER.

Witnesses:
GEO. W. GREGORY,
MARGARET A. DUNN.